United States Patent
Yee et al.

(10) Patent No.: US 9,106,146 B2
(45) Date of Patent: Aug. 11, 2015

(54) ENERGY-SAVING CONTROL DEVICE

(71) Applicant: SYNC POWER CORPORATION, Taipei (TW)

(72) Inventors: Hsian-Pei Yee, Taipei (TW); Chun-Jen Huang, Taipei (TW)

(73) Assignee: SYNC POWER CORPORATION, Taipei (TW)

( * ) Notice: Subject to any disclaimer, the term of this patent is extended or adjusted under 35 U.S.C. 154(b) by 252 days.

(21) Appl. No.: 13/830,459

(22) Filed: Mar. 14, 2013

(65) Prior Publication Data

US 2014/0268916 A1 Sep. 18, 2014

(51) Int. Cl.
*H02M 3/335* (2006.01)
*H02M 1/00* (2007.01)

(52) U.S. Cl.
CPC .......... *H02M 3/33576* (2013.01); *H02M 3/335* (2013.01); *H02M 3/33592* (2013.01); *H02M 2001/0032* (2013.01); *Y02B 70/16* (2013.01)

(58) Field of Classification Search
CPC ....................................................... H02M 3/335

USPC ............ 363/21.06, 21.08, 21.1, 21.11, 21.13, 363/21.14, 21.18
See application file for complete search history.

(56) References Cited

U.S. PATENT DOCUMENTS

2009/0109711 A1* 4/2009 Hsu ............................. 363/21.14

* cited by examiner

*Primary Examiner* — Matthew Nguyen
*Assistant Examiner* — Trinh Dang
(74) *Attorney, Agent, or Firm* — Muncy, Geissler, Olds & Lowe, P.C.

(57) ABSTRACT

An energy-saving control device is disclosed. The control device is connected with an integrated circuit (IC) and a secondary winding of a transformer of a power converter. A primary winding of the transformer receives energy, and then the energy is discharged from the secondary winding and an energy signal of the energy is generated. And the energy signal comprises a high-frequency part and a low-frequency part thereafter. The energy signal is received by the energy-saving control device to control the operation of the IC according to a ratio of the low-frequency part to the high-frequency part.

9 Claims, 8 Drawing Sheets

US 9,106,146 B2

ENERGY-SAVING CONTROL DEVICE

BACKGROUND OF THE INVENTION

1. Field of the Invention

The present invention relates to a control device, particularly to an energy-saving control device.

2. Description of the Related Art

Due to the fact that internal elements of most electric devices require direct-current (DC) voltages, a power supply is used to convert alternating-current (AC) voltages into the DC voltages such that the electric device operate well. The power supply is divided into a linear power supply and a switching power supply by circuit architecture. In order to obtain different power, the switching power supply is divided into Flyback, Forward, Full Bridge, Half-Bridge and Push-Pull power supply.

Take Flyback power supply for example. As shown in FIG. 1 and FIG. 2, a power converter circuit includes a transformer 10 having a primary winding PW and a secondary winding SW and an N-channel metal oxide semiconductor field effect transistor (NMOSFET) 12 connected to the primary winding PW. The secondary winding SW is connected with an IC 14. An input high voltage $V_H$ is applied to the primary winding PW. A voltage $V_G$ is periodically applied ($T_{ON}$) to the gate of the NMOSFET 12 to control the transfer of power from the primary winding PW to the secondary winding SW. When the NMOSFET 12 is turned on, the energy is stored in the transformer 10. As the NMOSFET 12 is turned off, the stored energy in the transformer 10 is discharged.

A reflected voltage $V_R$ is generated when the NMOSFET 12 is turned off. As a result the voltage $V_{DS}$ across the NMOSFET 12 equals the input high voltage $V_H$ plus the reflected voltage $V_R$. While the NMOSFET 12 is turned off, a parasitic drain-to-source capacitor inherent in the NMOSFET 12 stores the energy from the voltage $V_D$.

After a discharge period $T_{DS}$ the energy of the transformer 10 is fully discharge and the energy stored in the parasitic drain-to-source capacitor flows back to the input high voltage $V_H$ through the primary winding PW of the transformer 10.

The primary winding PW and the parasitic drain-to-source capacitor along with parasitic elements on the secondary winding create a resonant tank with a resonant frequency $f_R$. While resonating, energy flows back and forth between the primary winding PW and the parasitic drain-to-source capacitor.

When the energy is discharged, an energy signal is generated at the drain. The energy signal has a high-frequency part and a low-frequency part. If the low-frequency part has a period larger than the high-frequency part and the IC 14 still operates, the operation of the IC 14 results in power loss.

To overcome the abovementioned problems, the present invention provides an energy-saving control device, so as to solve the afore-mentioned problems of the prior art.

SUMMARY OF THE INVENTION

A primary objective of the present invention is to provide an energy-saving control device, which connects with an integrated circuit (IC) and a transformer of a power converter. When no energy is discharged from the transformer for a long time, the control device can turn the IC into sleep mode to effectively save energy.

To achieve the abovementioned objectives, the present invention provides an energy-saving control device, which connects with an IC and a secondary winding of a transformer. A primary winding of the transformer receives energy, and then the energy is discharged from the secondary winding. The energy signal of the energy comprises a high-frequency part and a low-frequency part thereafter. The energy-saving control device receives the energy signal to control an operation of the IC according to a ratio of the low-frequency part to the high-frequency part.

Below, the embodiments are described in detail in cooperation with the drawings to make easily understood the technical contents, characteristics and accomplishments of the present invention.

DETAILED DESCRIPTION OF THE INVENTION

Figure 1:
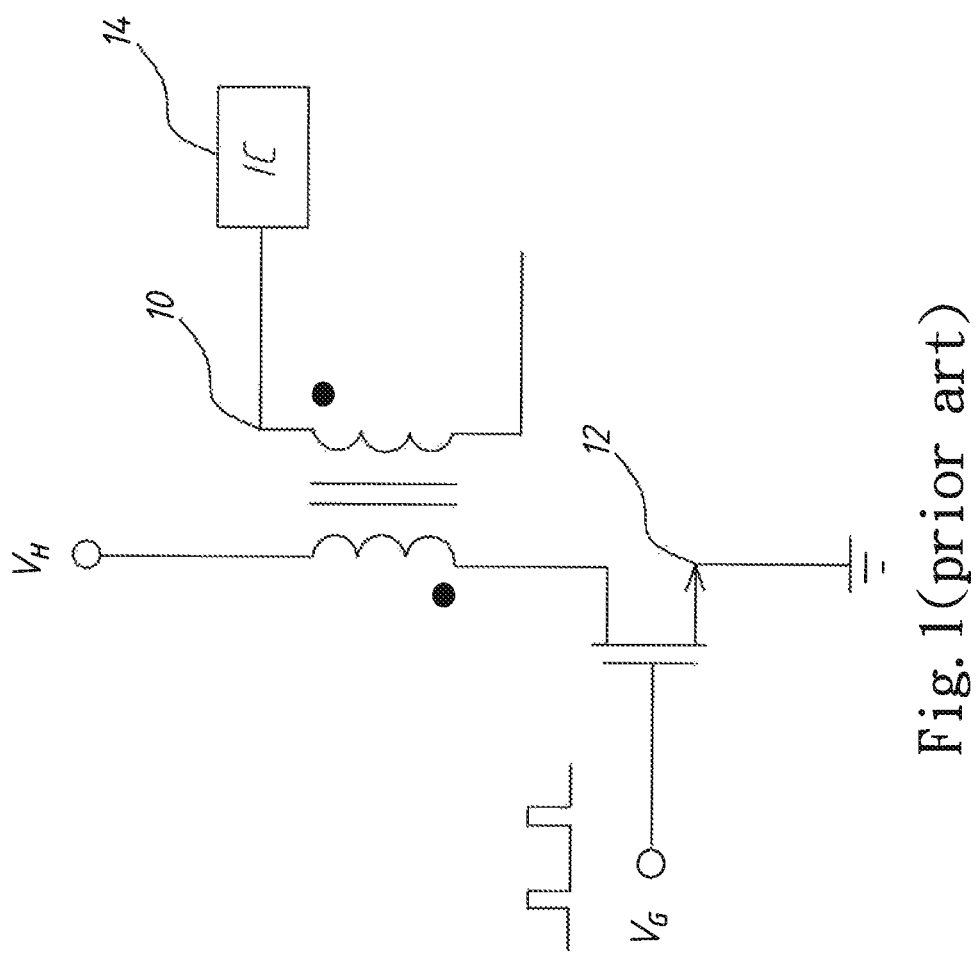
FIG. 1 is a schematic diagram illustrating a portion of a power converter circuit of the prior art.
Figure 2:
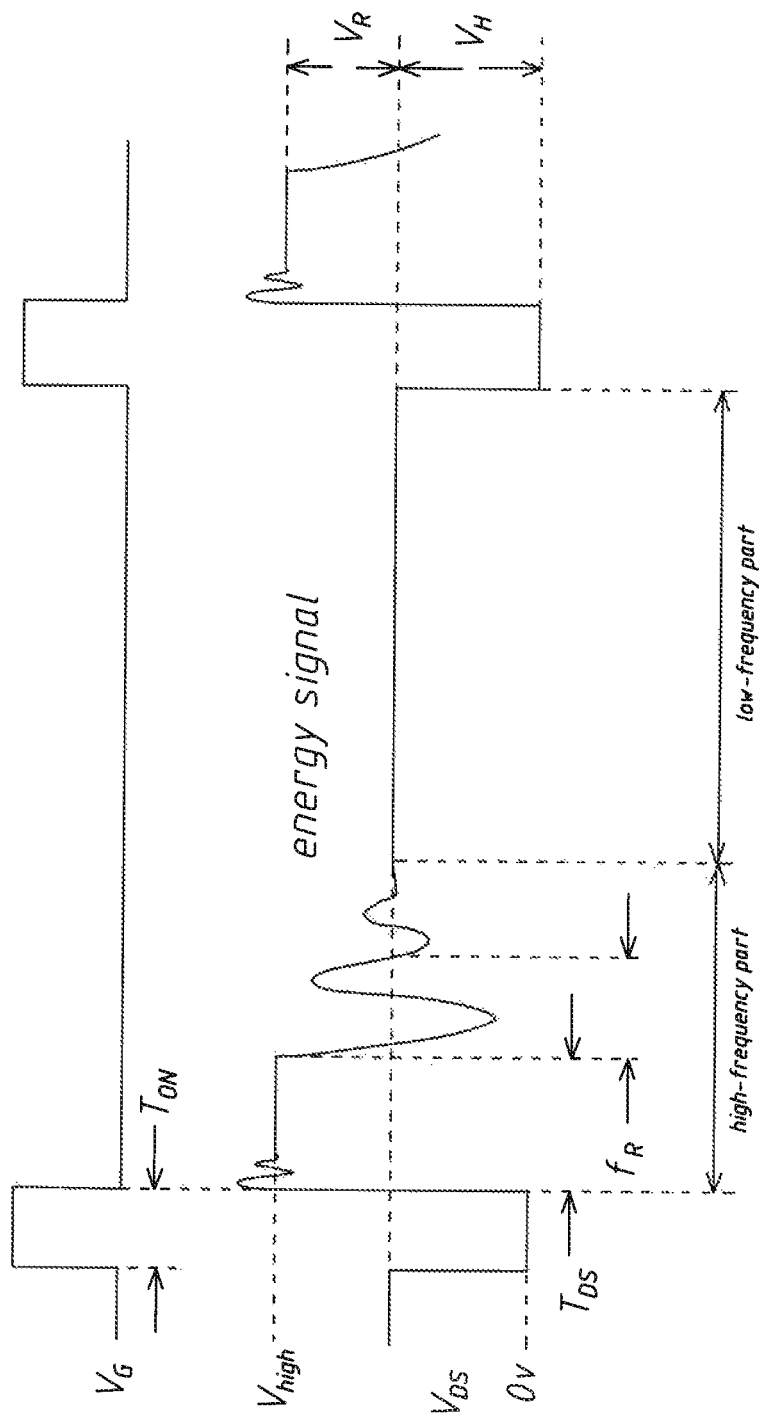
FIG. 2 is a diagram illustrating voltages in the circuit of FIG. 1.
Figure 3:
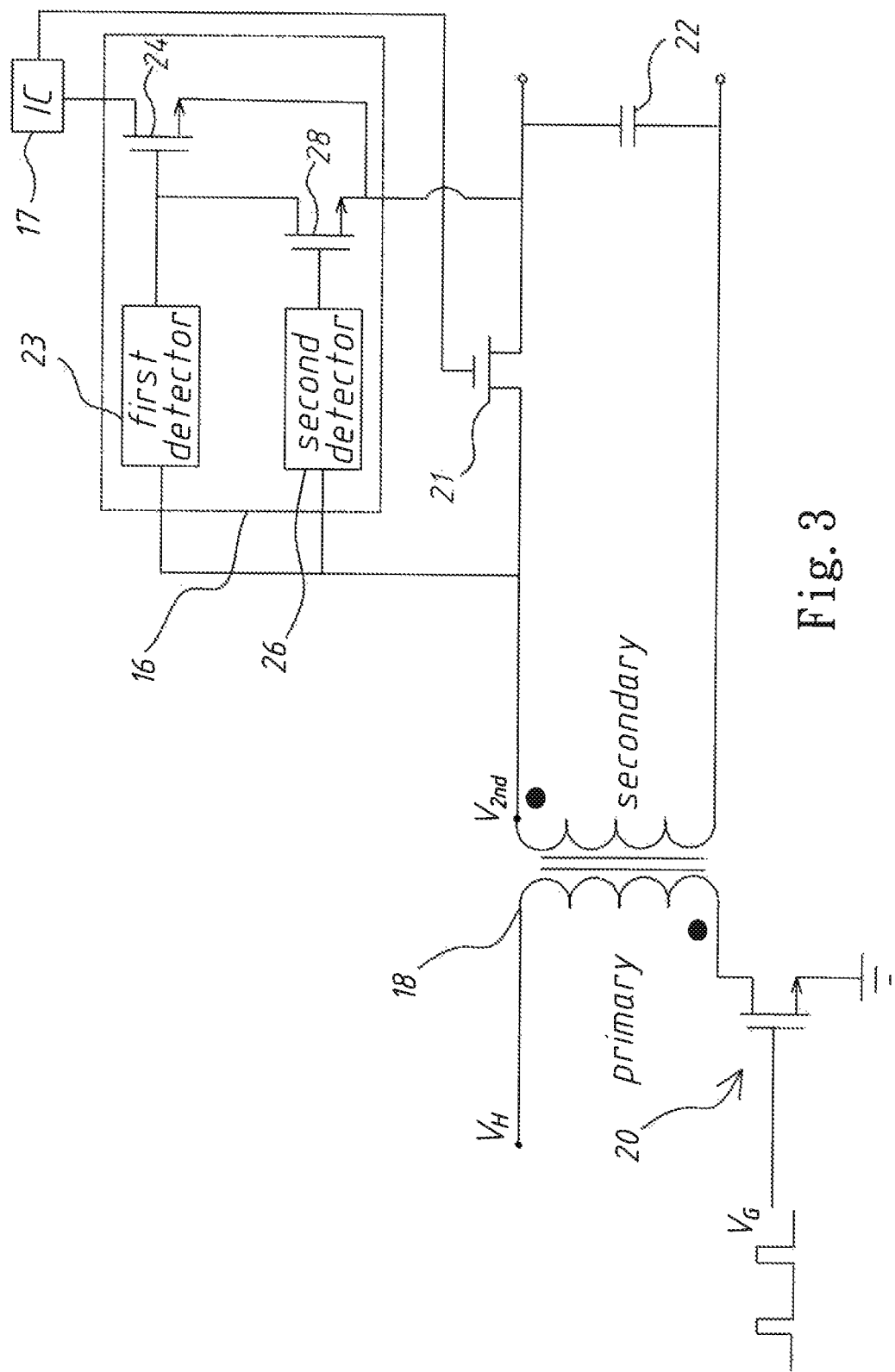
FIG. 3 is a schematic diagram illustrating an energy-saving control device connected with a portion of Flyback power converter circuit according to an embodiment of the present invention.
Figure 4:
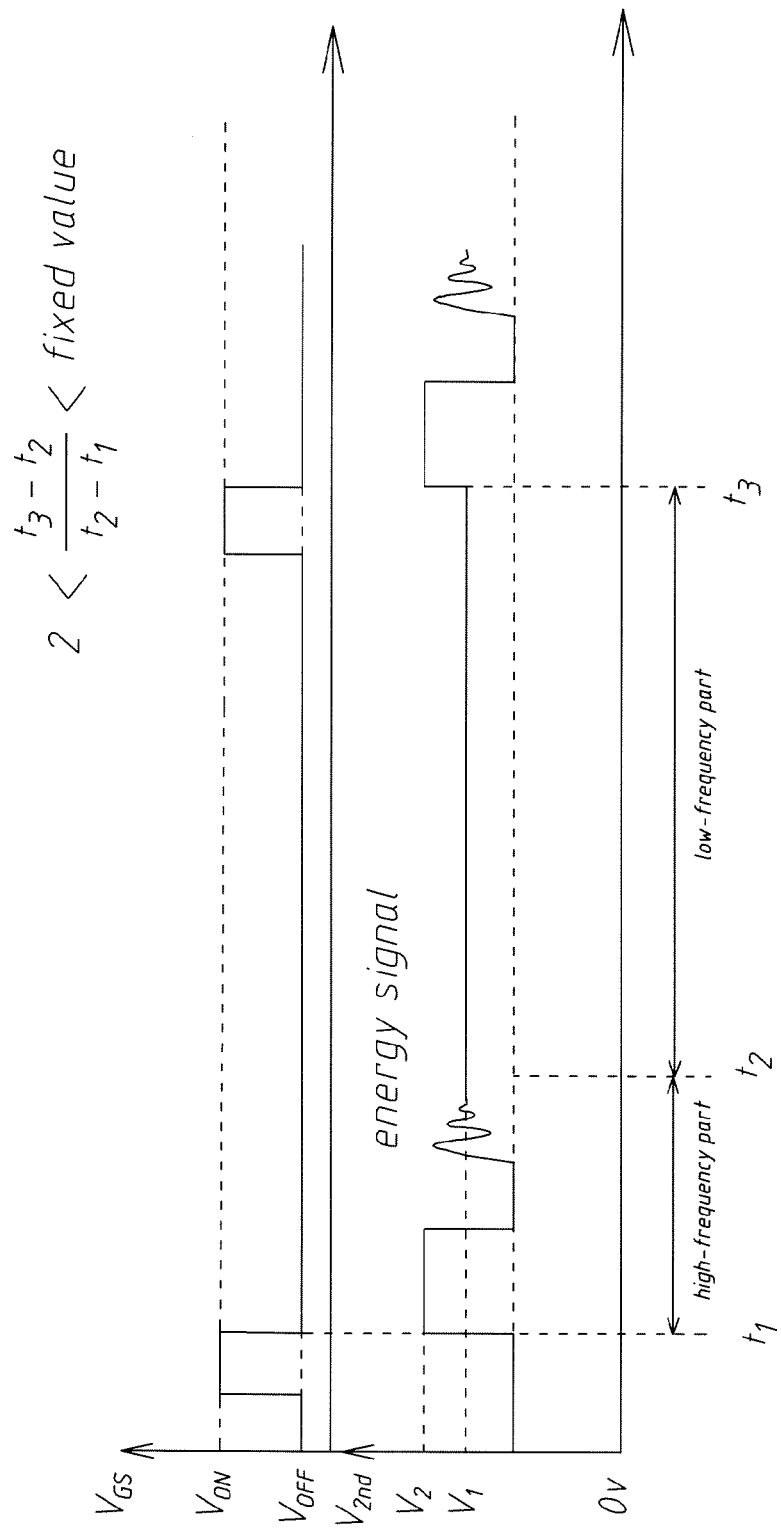
FIG. 4 and FIG. 5 are diagrams illustrating different voltages in the circuit of FIG. 3.
Figure 5:
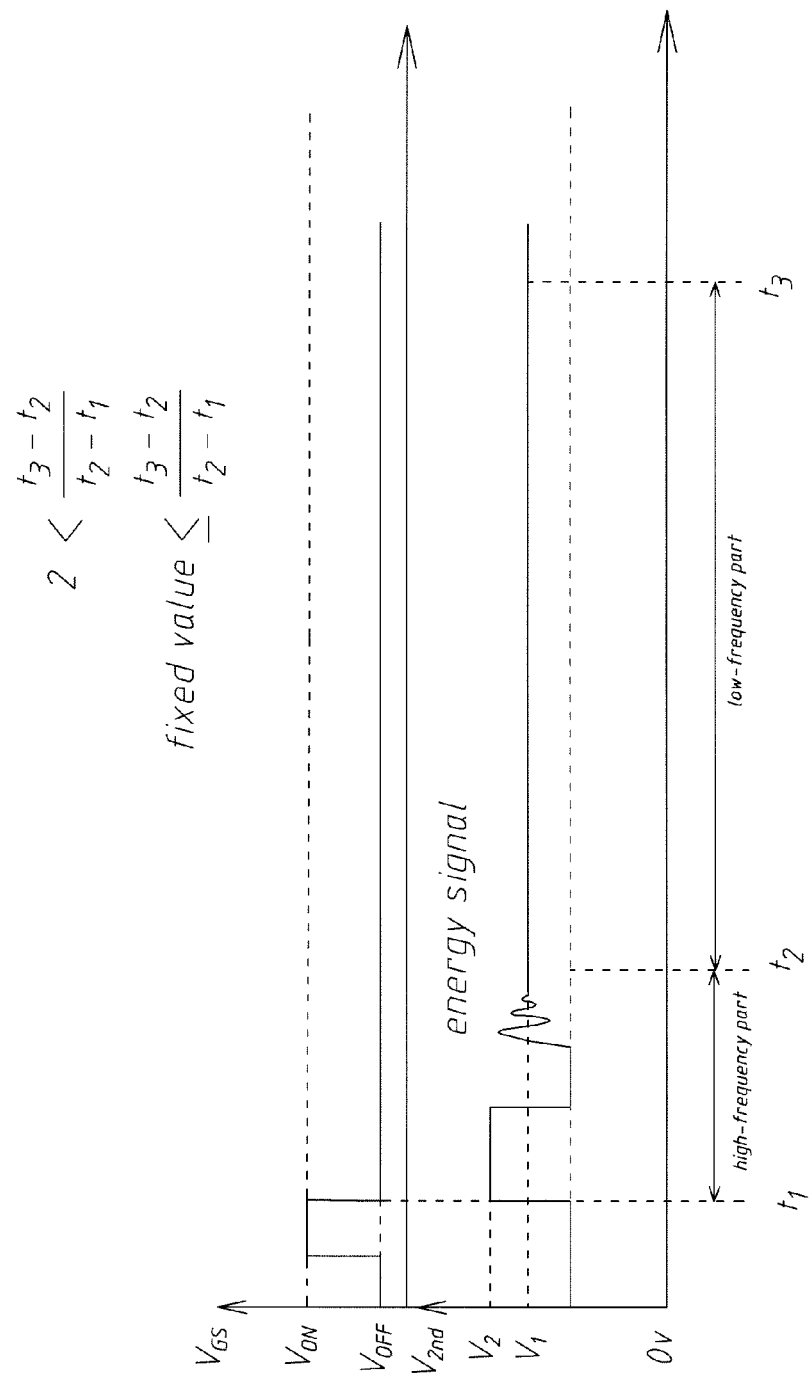

The present invention provides an energy-saving control device connected between a transformer and an integrated circuit (IC). Take Flyback power supply as an example. Refer to FIG. 3, FIG. 4 and FIG. 5. The energy-saving control device 16 of the present invention connects with an integrated circuit (IC) 17 and a secondary winding of a transformer 18 of a power converter. A primary winding of the transformer 18 connects with a drain of an N-channel metal oxide semiconductor field effect transistor (NMOSFET) 20 and a high voltage terminal $V_H$, and a source of the NMOSFET 20 connects with a low voltage terminal. In the embodiment, the low voltage terminal is grounded which is used as an example. An NMOSFET 21 is connected with the IC 17 and the secondary winding, and two ends of a capacitor 23 are respectively connected with the secondary winding and the NMOSFET 21. The energy-saving control device 16 is connected with a node between the NMOSFET 21 and the capacitor 23. Energy from the high voltage terminal $V_H$ is stored in the primary winding when the NMOSFET 20 is turned on. The energy is discharged from the secondary winding and an energy signal of the energy is generated when the NMOSFET 20 is turned off. Meanwhile, the energy is stored in the capacitor 22 through the NMOSFET 21. The energy stored in the capacitor 22 does not be transmitted to the secondary winding due to a reverse voltage of a parasitic diode of the NMOSFET 21. The energy signal comprises a high-frequency part and a low-frequency part thereafter. The energy-saving control device 16 receives the energy signal to control the operations of the IC 17 according to a ratio of the low-frequency part to the high-frequency part. When the ratio is equal to or larger than a fixed value, the energy-saving control device 16 turns IC 17 in sleep. For instance, the fixed value is greater than 2. When the ratio is less than the fixed value, the energy-saving control device 16 awakes the IC 17. Alternatively or in combination, the energy-saving control device 16 measures a voltage to determine the low-frequency part and the high-frequency part since a voltage of the high-frequency part is higher than that of the low-frequency part. As shown in FIG. 4 and FIG. 5, the signal between $t_1$ and $t_2$ is called high-frequency part, and the signal between $t_2$ and $t_3$ is called low-frequency part.

The energy-saving control device 16 comprises a first detector 23, a first switch 24, a second detector 26 and a second switch 28. The first and second detectors 22 and 26 and the first and second switches 24 and 28 are integrated within the IC 17 or are independent from the IC 17. The first detector 23 is connected with the secondary winding and receives the energy signal to generate a turn-off signal. The first switch 24, for example, but not limited to an NMOSFET, a P-channel metal oxide semiconductor field effect transistor (PMOSFET) or a bipolar junction transistors (BJT), is connected with the first detector 23, the node and the IC 17 and receives the turn-off signal to be turned on to turn the IC 17 in sleep. The second detector 26 is connected with the secondary winding and receives the energy signal to generate a first control signal or a second control signal according to the ratio. The second switch 28, for example, but not limited to an NMOSFET, a PMOSFET or a BJT, is connected with the second detector 26, the node, the first detector 23 and the first switch 24. The second switch 28 receives the first control signal to be turned on to guide the turn-off signal to the node, so that the IC 17 is awaked. Alternatively, the second switch 28 receives the second control signal to be turned off, thereby effectively saving energy.

The operation of the present invention is introduced as below. Firstly, the primary winding of the transformer 18 receives and stores the energy from the high voltage terminal $V_H$ when the NMOSFET 20 is turned on. Then, the energy is discharged from the secondary winding and the energy signal of the energy is generated when the NMOSFET 20 is turned off. The first detector 23 receives the energy signal to generate the turn-off signal and transmits it to the first switch 24. The first switch 24 is turned on so that the IC 17 is in sleep. However, the second detector 26 also receives the energy signal and generates the first control signal or the second control signal according to the ratio. When the ratio is equal to or larger than the fixed value, the second control signal is generated. When the ratio is less than the fixed value, the first control signal is generated. As shown in FIG. 4, the first control signal is received by the second switch 28. Then, the second switch 28 is turned on, so that the IC 17 is awaked. As shown in FIG. 5, the second control signal is received by the second switch 28. Then, the second switch 28 is turned off. As a result, the IC 17 is still in sleep.

Figure 6:
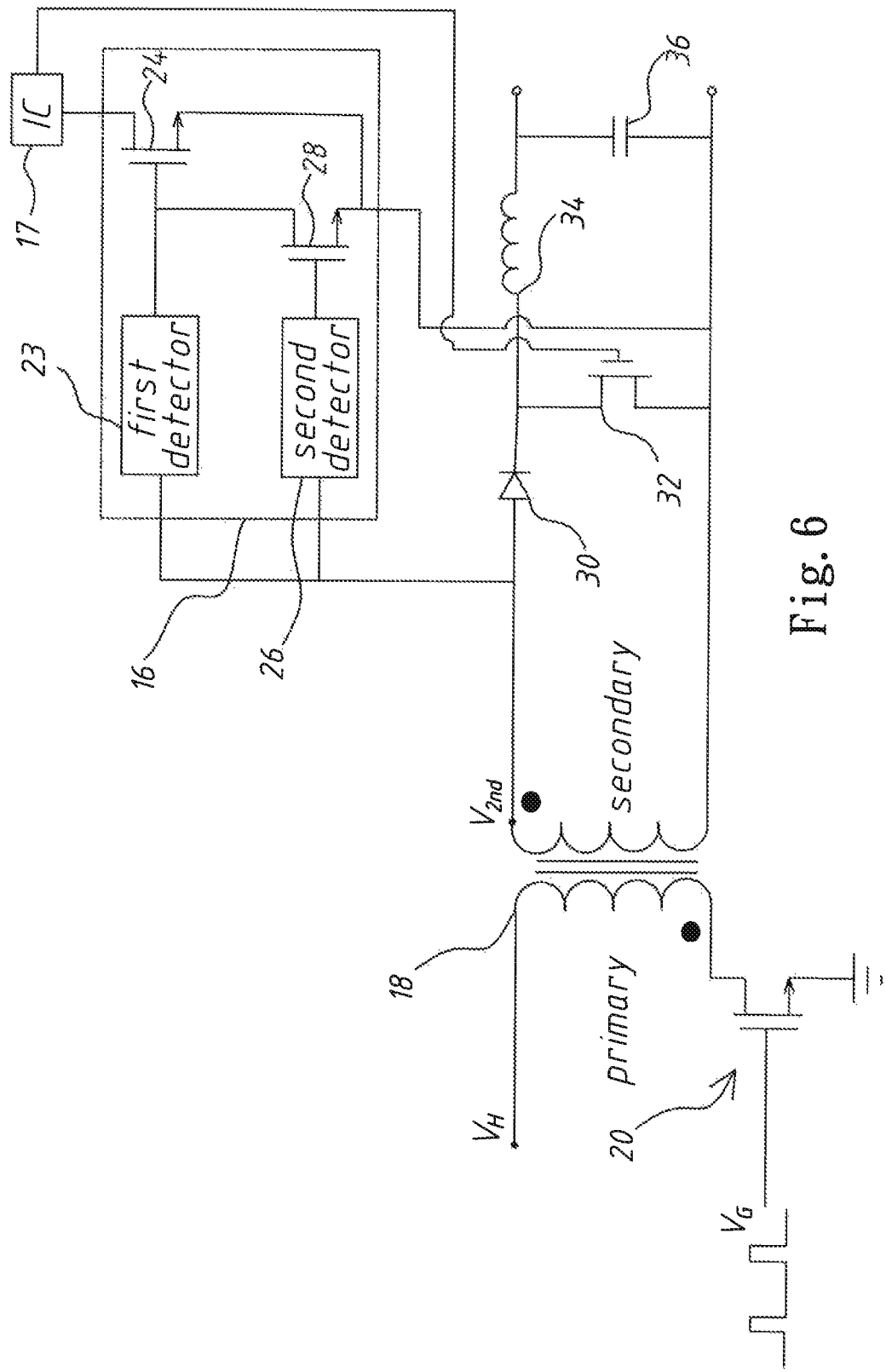
FIG. 6 is a schematic diagram illustrating an energy-saving control device connected with a portion of Forward power converter circuit according to an embodiment of the present invention.
Figure 7:
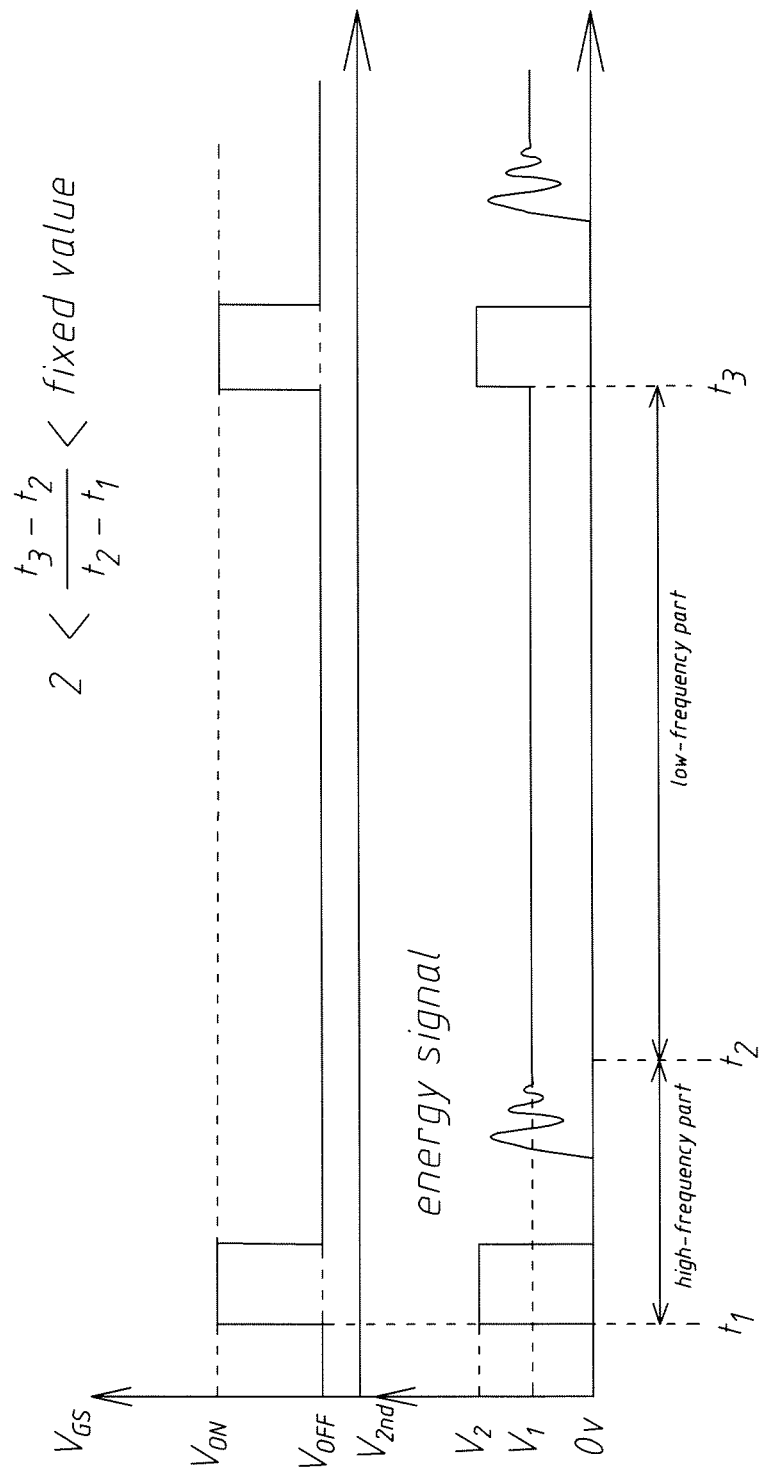
FIG. 7 and FIG. 8 are diagrams illustrating different voltages in the circuit of FIG. 6.
Figure 8:
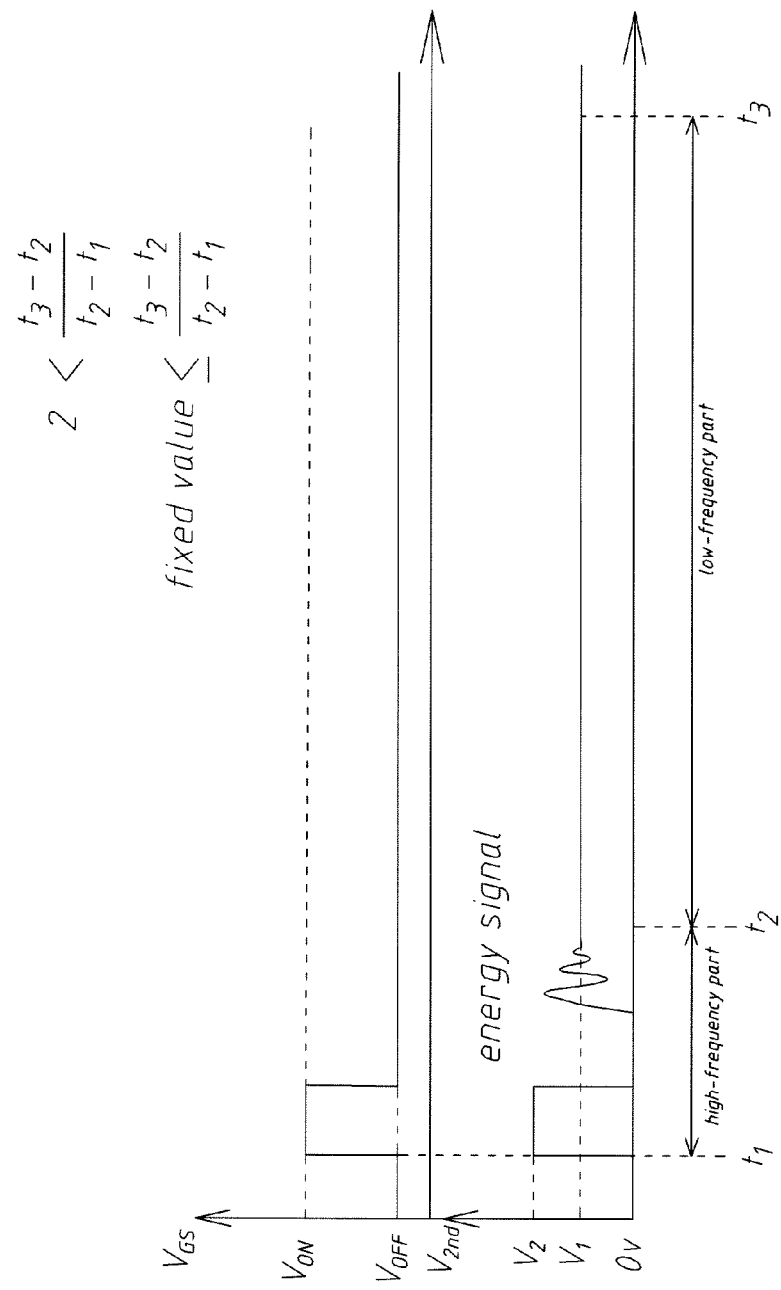

Take Forward power supply as an example. Refer to FIG. 6, FIG. 7 and FIG. 8. The energy-saving control device 16 of the present invention connects with an integrated circuit (IC) 17 and a secondary winding of a transformer 18 of a power converter. A primary winding of the transformer 18 connects with a drain of NMOSFET 20 and a high voltage terminal $V_H$, and a source of the NMOSFET 20 is grounded. An anode of a first diode 30 is connected with the secondary winding and the first and second detectors 23 and 26. A cathode of the first diode 30 is connected with the first and second switches 24 and 28. A source, a drain and a gate of an NMOSFET 32 are respectively connected with the secondary winding, the cathode of the first diode 30 and the IC 17. Two ends of an inductor 34 are respectively the cathode of the first diode 30 and one end of a capacitor 36, and another end of the capacitor 36 is connected with the secondary winding. The primary winding receives energy from the high voltage terminal $V_H$ and the energy is discharged from the secondary winding and an energy signal of the energy is generated when the NMOSFET 20 is turned on. Meanwhile, the energy is stored in the capacitor 36 through the first diode 30 and the inductor 34. The energy stored in the capacitor 36 does not be transmitted to the secondary winding due to a reverse voltage of first diode 30. The energy signal also comprises a high-frequency part and a low-frequency part thereafter. The operation of the energy-saving control device 16 have been described previously so will not be reiterated.

In the beginning, the primary winding receives the energy from the high voltage terminal $V_H$ and the energy is discharged from the secondary winding and the energy signal of the energy is generated when the NMOSFET 20 is turned on. The first detector 23 receives the energy signal to generate the turn-off signal and transmits it to the first switch 24. The first switch 24 is turned on so that the IC 17 is in sleep. However, the second detector 26 also receives the energy signal and generates the first control signal or the second control signal according to the ratio of the low-frequency part to the high-frequency part. When the ratio is equal to or larger than the fixed value, the second control signal is generated. When the ratio is less than the fixed value, the first control signal is generated. As shown in FIG. 7, the first control signal is received by the second switch 28. Then, the second switch 28 is turned on, so that the IC 17 is awaked. As shown in FIG. 8, the second control signal is received by the second switch 28. Then, the second switch 28 is turned off. As a result, the IC 17 is still in sleep.

In conclusion, when no energy is discharged from the transformer for long, turning off the IC can effectively save energy.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. An energy-saving control device, which connects with an integrated circuit (IC) and a secondary winding of a transformer, and a primary winding of said transformer connects with an N-channel metal oxide semiconductor field effect transistors (NMOSFET), receives and stores energy when said NMOSFET is turned on, and then said energy is discharged from said secondary winding and an energy signal of said energy comprises a high-frequency part and a low-frequency part thereafter, and said low-frequency part and said high-frequency part respectively occupies a first time duration and a second time duration, characterized in that said low-frequency part appears during said NMOSFET is turned off, and that said energy-saving control device receives said energy signal to control an operation of said IC according to a ratio of said first time duration to said second time duration.

2. The energy-saving control device of claim 1, wherein said ratio of said first time duration to said second time duration is equal to or larger than a fixed value, then said IC is in sleep.

3. The energy-saving control device of claim 1, wherein said ratio of said first time duration to said second time duration is less than a fixed value, then said IC is awaked.

4. The energy-saving control device of claim 1, wherein a voltage of said high-frequency part is higher than that of said low-frequency part.

5. The energy-saving control device of claim 1, further comprising:
a first detector connecting with said secondary winding and receiving said energy signal to generate a turn-off signal;

a first switch connecting with said first detector, said secondary winding and said IC and receiving said turn-off signal to be turned on whereby said IC is in sleep;

a second detector connecting with said secondary winding and receiving said energy signal to generate a first control signal or a second control signal according to said ratio; and a second switch connecting with said second detector, said secondary winding, said first detector and said first switch, and said second switch receives said first control signal to be turned on to awake said IC; and said second switch receives said second control signal to be turned off.

6. The energy-saving control device of claim 2, wherein said ratio of said first time duration to said second time duration is greater than 2.

7. The energy-saving control device of claim 3, wherein said ratio of said first time duration to said second time duration is greater than 2.

8. The energy-saving control device of claim 5, wherein said first and second switches are N-channel metal oxide semiconductor field effect transistors (NMOSFETs), P-channel metal oxide semiconductor field effect transistors (PMOSFETs) or bipolar junction transistors (BJTs).

9. The energy-saving control device of claim 5, wherein said first and second detectors and said first and second switches are integrated within said IC or are independent from said IC.

\* \* \* \* \*